A. Bartholf,
Converting Motion.

Nº 23,651.          Patented Apr. 19, 1859.

Witnesses          Inventor:
                         Abraham Bartholf

UNITED STATES PATENT OFFICE.

ABRAHAM BARTHOLF, OF NEW YORK, N. Y.

IMPROVEMENT IN DEVICES FOR CONVERTING ALTERNATE CIRCULAR MOTION INTO DIRECT CIRCULAR MOTION.

Specification forming part of Letters Patent No. 23,651, dated April 19, 1859.

*To all whom it may concern:*

Be it known that I, ABRAHAM BARTHOLF, of the city, county, and State of New York, have invented a new and useful Device for Converting Alternate Circular or Oscillating Motion into Direct Circular Motion; and I do hereby declare that the following is a full, clear, and exact description of the same, reference being had to the accompanying drawings, forming part of this specification, in which—

Figure 1:
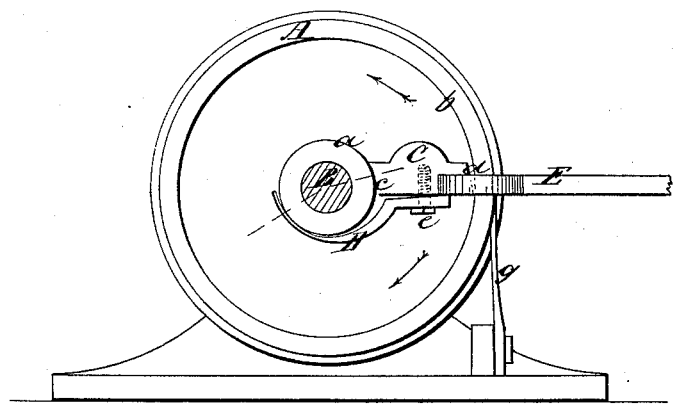
Figure 2:
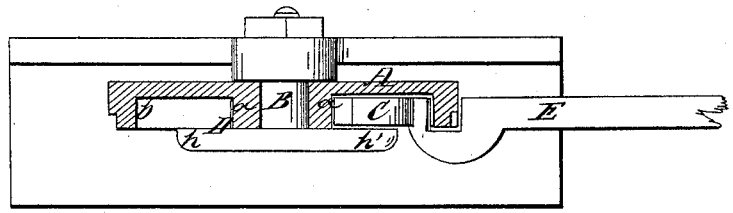

Figure 1 is a view of the device taken in a plane parallel with the plane of motion. Fig. 2 is a section of the same in a plane perpendicular to the plane of motion.

Similar letters of reference indicate corresponding parts in the two figures.

My invention consists in a certain novel, simple, and effective mode of applying and arranging a dog and lever and a spring in combination with a wheel or other body to which the direct motion is to be imparted, whereby as the lever is moved in one direction the dog is caused to bite upon the surface of and move the wheel or body to which it is applied, and as it is moved in the other direction the dog is caused to slip over the said surface.

To enable others skilled in the art to make and apply my invention, I will proceed to describe its construction and operation.

A is a wheel to which direct motion is to be imparted, having a concentric groove $a\,b$ turned in one side. This wheel is represented as fitted to rotate on a fixed axle B; but it may be secured to a revolving shaft.

E is the lever, and C the dog by which the said motion is to be imparted to the said wheel, and D is the spring by which the operation of the dog is governed. The dog C, which is attached rigidly to the lever, is made with two smooth faces $c\,d$, which are so fitted to the groove $a\,b$ that the dog may slide freely or be jammed or cramped between the two peripherical surfaces $a$ and $b$, according as the position of the lever may approximate more or less to a line radial to the axis of the wheel. The spring D, which is in the form of a bow, has one end secured to the dog by a set-screw $e$, as shown in Fig. 1, and its normal curvature is such that when placed with the dog in the groove $a\,b$ it will partly encircle the hub-like inner peripherical surface of the groove, and, bearing down upon the said surface at a point where it causes the face $c$ of the dog to press against it, (as indicated by the red radial lines in Fig. 1 passing through the two bearing-points,) will so draw the face $c$ close to the face $a$ and throw the lower edge of the face $d$ of the dog out against the outer peripherical face $b$ of the groove. The dog being thus held by the spring can be moved in the groove $a\,b$ in a direction following the spring, as indicated by the black arrow in Fig. 1, as when force is applied to the lever to move the dog and spring in that direction it tends to unbend the spring and ease the pressure of the two faces $c$ and $d$ of the dog against the faces $a\,b$ of the groove in the wheel; but when force is applied to the lever to move the dog in the opposite direction (indicated by the red arrow in Fig. 1) the spring is encouraged in drawing the faces $c$ and $d$ of the dog closer to the faces $a$ and $b$ of the groove, and the resistance that is created by friction to the movement of the face $d$ makes the point of contact between the faces $d$ and $b$ constitute a fulcrum to the lever and dog, and the force applied to the lever is thus made to press the face $c$ tightly against $a$, and the dog being tightly jammed or cramped within the groove carries the wheel around with the lever.

$g$ is a friction-brake of sufficient strength to prevent the wheel being moved in the direction of the black arrow by the slight friction produced by the spring and dog in moving in that direction.

$h$ is a broad flange on the axle E to confine the dog laterally in the groove $a\,b$.

This device is applicable to many useful purposes—as, for instance, to drive the feed-wheel of a sewing-machine or any other wheel in which an intermittent but direct rotary motion is required, and by applying a fly-wheel in connection with the wheel A a continuous rotary motion may be obtained.

The distinguishing characteristic of this device as compared with other devices operating on a similar principle is the small number of its parts and the extreme simplicity of its construction, it having no joints, connecting-links, or connections of any kind, and being composed but of two pieces, the dog and lever being in one piece and the spring another, and even the spring may be made of the same piece as the dog and lever. The dog and lever are not, however, necessarily made in one piece, but may be made separately and secured rigidly together.

What I claim as my invention, and desire to secure by Letters Patent, is—

The dog C, spring D, and lever E, combined and arranged relatively to each other and applied to the wheel A or its equivalent substantially as herein described.

ABRAHAM BARTHOLF.

Witnesses:
WM. TUSCH,
MICH. HUGHES.